United States Patent [19]
Stein et al.

[11] Patent Number: 5,341,225
[45] Date of Patent: Aug. 23, 1994

[54] IMAGE SCANNING SYSTEM AND METHOD WITH IMPROVED REPOSITIONING

[75] Inventors: Irene F. Stein; Greg A. Degi, both of Fort Collins; David W. Boyd, Greeley; Steven L. Webb, Loveland, all of Colo.

[73] Assignee: Hewlett-Packard Company, Palo Alto, Calif.

[21] Appl. No.: 704,576

[22] Filed: May 22, 1991

Related U.S. Application Data

[63] Continuation of Ser. No. 699,844, May 14, 1991, abandoned.

[51] Int. Cl.$^5$ .............................................. H04N 1/04
[52] U.S. Cl. .................................... 358/498; 358/497
[58] Field of Search ............... 358/75, 80, 471, 474, 358/486, 497, 498

[56] References Cited

U.S. PATENT DOCUMENTS

| | | | |
|---|---|---|---|
| 4,367,493 | 1/1983 | Matteson | 358/293 |
| 4,511,928 | 4/1985 | Colomb | 358/280 |
| 4,575,769 | 3/1986 | Arnoldi | 358/498 |
| 4,591,727 | 5/1986 | Gaebelein et al. | 250/578 |
| 4,651,221 | 3/1987 | Yamaguchi | 358/260 |
| 4,748,514 | 5/1988 | Bell | 358/288 |
| 4,752,891 | 6/1988 | Van Daele et al. | 364/518 |
| 4,992,888 | 2/1991 | Nagashima | 358/410 |

FOREIGN PATENT DOCUMENTS

| | | |
|---|---|---|
| 0062479 | 10/1982 | European Pat. Off. . |
| 0159192 | 10/1985 | European Pat. Off. . |
| 0363983 | 4/1990 | European Pat. Off. . |
| 0393659 | 10/1990 | European Pat. Off. . |

*Primary Examiner*—Stephen Brinich

[57] ABSTRACT

An image scanning system for producing digital data of a predetermined resolution representing a scanned image of an original. The system includes a photosensing array for generating the digital data, a stepper motor having steps of predetermined size for positioning the array with respect to the original, an image buffer for storing the data and control system for synchronizing the scanning and the storing of data at one or more Y-positioning speeds. Scan line extents along the Y-direction are defined by the relationship of the Y-positioning speed to the array exposure time. The scan lines in conjunction with the present invention have boundaries, wherein the boundaries can occur on or between said motor steps.

5 Claims, 13 Drawing Sheets

IMAGE SCANNING SYSTEM AND METHOD WITH IMPROVED REPOSITIONING

This application is a continuation of U.S. patent application Ser. No. 07/699,844, filed May 14, 1991, to Stein et al., now abandoned.

BACKGROUND OF THE INVENTION

1. Field of the Invention

The present invention relates to image scanners, and more particularly to improved Y-positioning of the scan window to achieve finer accuracy than the motor's step size. Improved repositioning is accomplished by synchronizing the center of the exposure time with the time the sensor array is over the center of the document line.

2. Related Art

Conventional scanners move the carriage at a single speed and use line dropping and duplication to obtain various resolutions. In present scanning systems the starting and restarting of scanning after a buffer full condition, for instance, is always done at a step motor's step boundary.

Once a scanner determines that scanning should halt due to a buffer full condition the stepper motor must be stopped and be restarted. However, because the carriage must decelerate for several motor steps, the stepper motor must be reversed to reposition the carriage. The restart of scanning is conventionally done at a motor step boundary. Hence, in conventional scanners, different scanning resolutions are achieved by selectively ignoring scanned lines. For instance, in a scanner with a 300 dot per inch (dpi) stepper motor speed, 200 dpi resolution can be achieved by only putting 2 out of 3 scanned lines into buffer memory.

In conventional scanners the granularity of the CCD's exposure time can cause up to one line of error in resolution of a paused scan, because only positional information is used to restart the scanner.

SUMMARY OF THE INVENTION

The present invention takes into consideration the CCD exposure time in the acceleration calculations to minimize granularity error. Allowing the scanner to resynchronize the beginning of a CCD's exposure time to known motor step increments makes the computation easier.

Differing Y-resolutions are achieved by varying the speed of the carriage.

The present invention combines the ability to synchronize the start of a CCD line with positioning information accurate to a small fraction of a stepper motor's step size, which enables the scanner to resume scanning after a mid-scan pause with a positional accuracy of much better than one line for a wide range of Y-positioning speeds. In addition, the above permits Y-positioning of the scan window to a finer accuracy than just the motor's step size.

The present invention is directed to the scanning of images in a system having a photosensing array, an image buffer and a stepper motor for producing digital data of an original at one or more resolutions having scan line extents along a Y-direction defined by the relationship of Y-positioning speed to array exposure time.

A control system is used to step the motor at the Y-positioning speed for positioning the array with respect to the original. The scanned data is then transferred to the image buffer. The control system also synchronizes the stepping and data transfer to vary the extent of the scan line with respect to the motor steps and achieve the one or more resolutions.

The center of the array exposure time is made to coincide with the time the array is positioned at the center of the scan line corresponding to the position of the array at the time of the scan line pause, then data transfer from the array to the image buffer is started again.

The image scanning system of the present invention is for producing digital data of a predetermined resolution representing a scanned image of an original. The system includes a photosensing (e.g., CCD or charge coupled device) array for generating analog data which in turn, is converted to digital data, a stepper motor having steps of predetermined size for positioning the CCD array with respect to the original, an image buffer for storing the data and a control system for synchronizing the storing with the output of the array at one or more Y-positioning speeds. Scan line extents along the Y-direction are defined by the relationship of the Y-positioning speed to the CCD exposure time. The scan lines in conjunction with the present invention have boundaries, wherein the boundaries can occur on or between motor steps.

BRIEF DESCRIPTION OF THE DRAWINGS

The invention will be better understood if reference is made to the accompanying drawings in which.

DETAILED DESCRIPTION OF THE PREFERRED EMBODIMENTS

Figure 1:
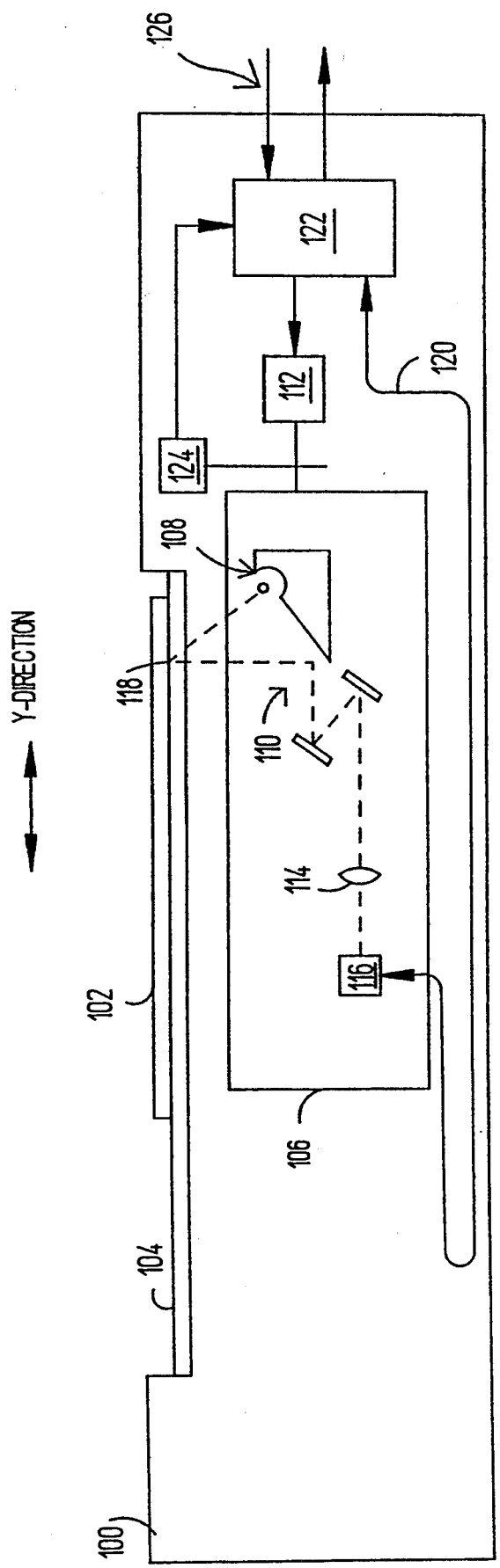
FIG. 1 is a partially schematic side view of the environment of a scanner system in conjunction with the present invention.
Figure 2:
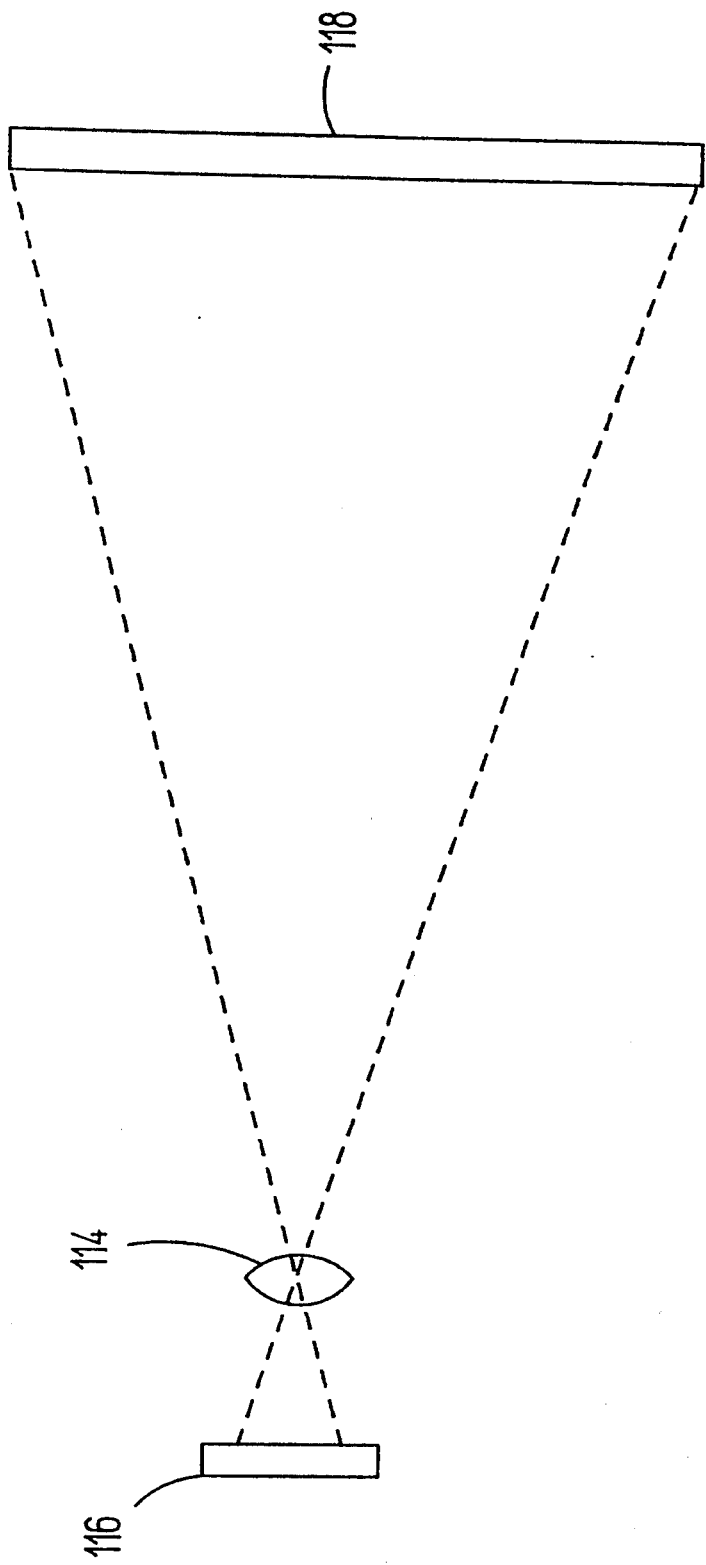
FIG. 2 is a linearized presentation of the optical path of the FIG. 1 scanner.
Figure 3:
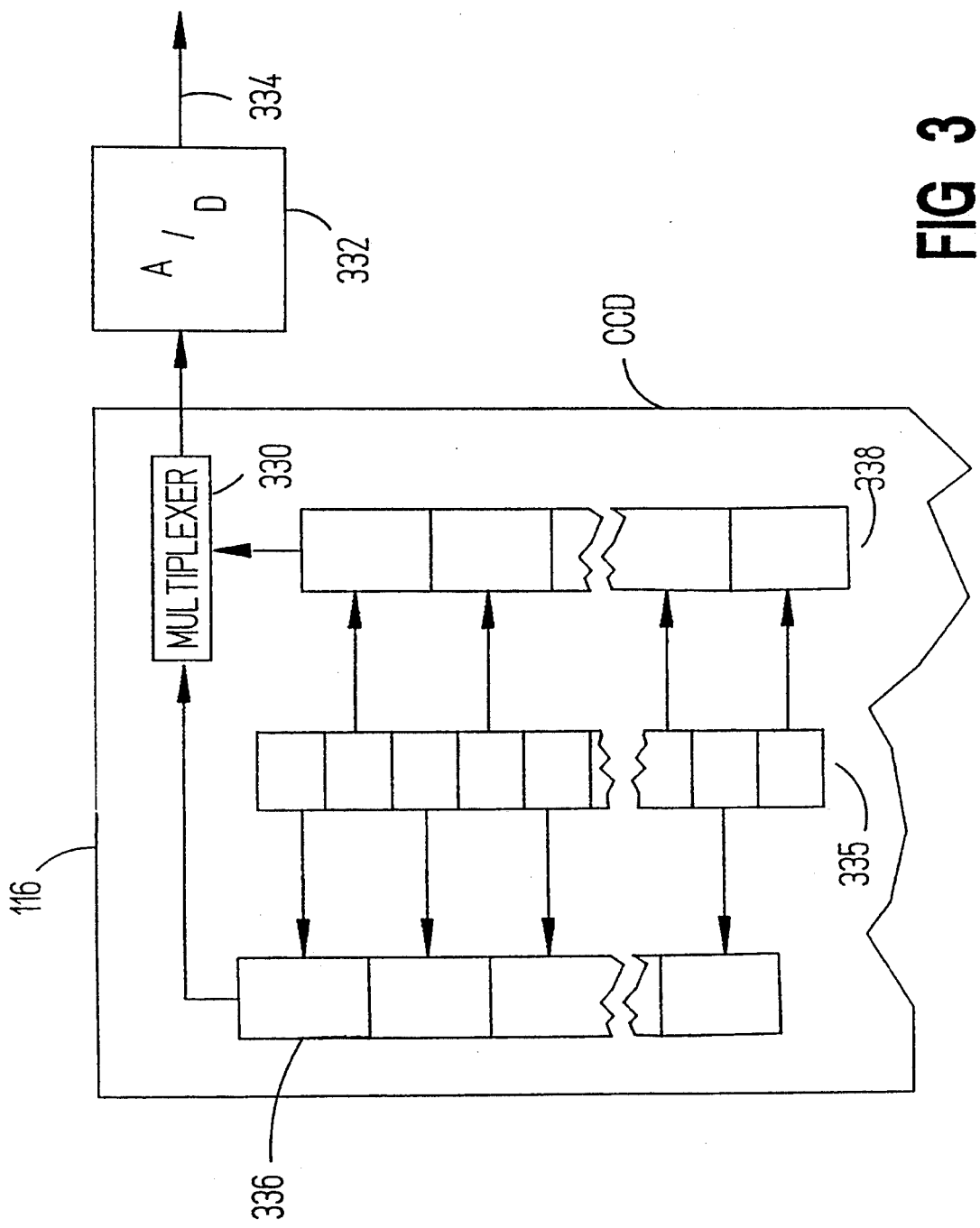
FIG. 3 is a partially broken schematic view of the circuitry for handling and digitizing sensed analog data received from a scanner system in conjunction with the present invention.

A typical document scanning machine environment for implementing the present invention is shown in FIGS. 1–3 in the form of a scanner system 100. While this scanner is of the general type in which the present invention finds utility, the invention is not limited to this structure.

In this exemplary scanner, document (or original) 102 is positioned with one side facing downwards on a transparent platen 104. The downward facing side of the document 102 is then scanned so as to convert the visual images contained thereon into all electronic image that is useable by data processing machines and the like.

The scanning is accomplished by the movable carriage 106 which contains a linear light source 108 and all array 110 of reflecting mirrors. A motor 112 is mechanically coupled to carriage 106 as by gears, cables or the like, to move the carriage 106 along the length of the platen 104. The light reflected from the platen 104 is redirected into a lens 114 and thence into a sensor array 116.

Note that alternative scanning arrangements are available. For instance, the lamp 108 could remain fixed with its light directed onto a scan line 118 by yet another mirror on the carriage 106. Further, a similar scanning result is possible by maintaining the lamp 108 as well as a mirror array 110 fixed while propelling the document 102 past a fixed scanning location corresponding to the line 118. Dual mirror carriages with one carriage moving at half the speed of the other to direct reflected light into the stationary sensor array 116 is still another prospective alternative configuration.

Sensor 116 is preferably a charge coupled device (CCD) assembly configured as a linear serial array of discrete detector cells. Each detector cell of the sensor array 116 defines a document picture element (PEL) or pixel. CCD's which can distinguish a variety of cell densities (e.g., 300 or 400 cells per inch) on the document are readily commercially available and can provide good quality resolution. Various other semiconductor elements which generate a resistance or potential in response to incident light can be used, such as photosensitive resistors for instance.

In FIG. 2, the typical image scan line 118 (note FIG. 1) is optically reduced in length as it passes through the lens 114 in a predetermined ratio (e.g., 7.5:1) before reaching the sensor array 116. The analog electrical signal content of the sensor array 116 is periodically read out, document line by document line, as the carriage 106 moves along the length of the document 102 on the platen 104, which thereby defines movement in the Y-direction.

With reference again to FIG. 1, the output scan signals from the sensor array 116 are coupled through a flexible cable 120 to an electronic controller 122 for conversion to digital form as described below in conjunction with FIG. 3. The controller 122 introduces drive signals to the motor 112 and can function in an open loop manner with no feedback. However, it may also receive position or movement feedback information relative to the carriage 106. The controller 122 incorporates the data processing and handling elements for exchanging data and signals with a remote processor in communication with the output cable 126 in accordance with the present invention. The operation of controller unit 122 is described in greater detail below in conjunction with FIG. 4 et seq.

FIG. 3 illustrates one arrangement for reading out the contents of the sensor array 116. By means of gating signal controls (not shown) typically from the controller 122, the analog signal content of every other detector cell 335 of the photocell array 116 is coupled in parallel into an analog shift register 336 while the signals present in the other, intervening cells 335 are coupled in parallel into an analog shift register 338. (The cells 335 may be photodiodes and the analog shift registers 336 and 338 may be charge coupled shifters.) That is, the contents of the odd numbered cells 335 of the array 116 are periodically transferred to the shift register 336, whereas the even numbered cells have their contents transferred to the shift register 338 at the same time.

The signals loaded into the shift registers 336 and 338 are analog signals representative of various reflected light levels from individual pixels of the document 102 into the cells 335 of the array 116. Their electrical analog magnitude corresponds to the average of the light reflected from a small incremental area or pixel on the surface of the document 102 over a predetermined period of time. Subsequent to transfer into the registers 336 and 338, these signals are shifted serially through a multiplexer 330 into an analog-to-digital converter (A/D) 332. A variety of analog-to-digital converters are commercially available for this purpose.

The output 334 of the A/D 332 is a sequence of bytes of data, for example, one byte of data for each document pixel (also called a PEL). Each byte is encoded so as to correspond digitally to the magnitude of an analog signal retrieved from the shift registers 336 and 338. Thus, each byte corresponds to the magnitude of reflected light present at one of the cells of the array 335. That is, if the array 335 images 300 cells or pixels per inch, the output 334 of the A/D 332 comprises a similar 300 bytes per inch.

Figure 4:
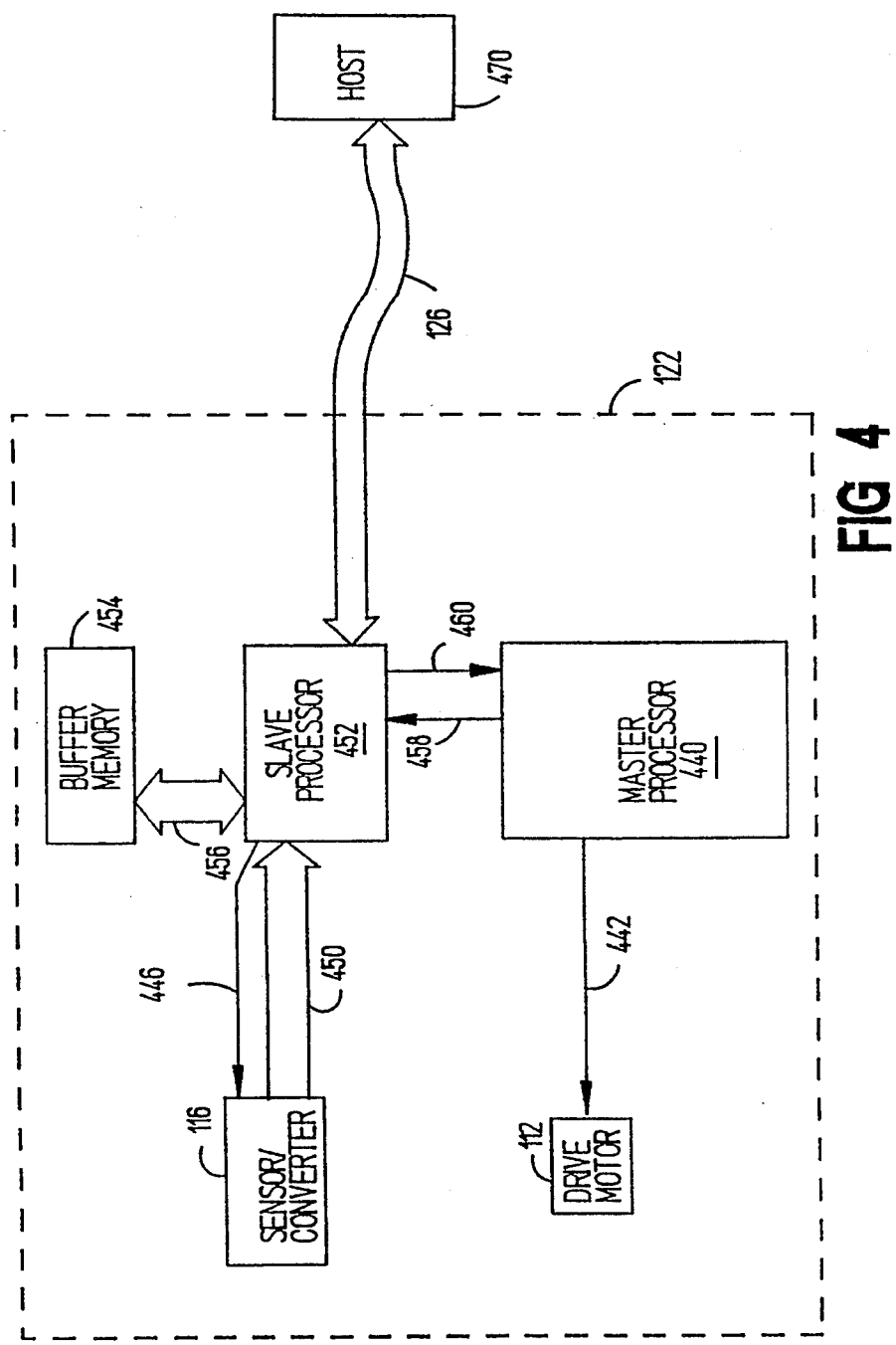
FIG. 4 is a block diagram of the circuit elements in conjunction with the present invention.

The organization of the major electrical and electronic elements associated with a preferred embodiment of this invention is set forth in block diagram form in FIG. 4. A master central processing unit (CPU) 440 controls movement of the carriage 106 (note FIG. 1) by appropriate activation signals on a connection 442 for stepping of the motor 112. In addition, a slave processor 452 turns on and off the CCD sampling and analog-to-digital conversion of the sensor/converter array 116 via control signal dialogue over a control line 446.

The digital data result obtained from the array 116 is presented in parallel on a multi line connection 450 to the slave processor 452 which inserts the bytes of data into a storage location in a buffer memory 454 over a bidirectional connection 456. Similarly, the buffer memory 454 transfers data back to the slave processor 452 via the connection 456. The slave processor 452 receives and stores data in response to commands from the master processor 440 via a connection 458 and continuously informs the master processor 440 of its status and operations over a connection 460.

The slave processor 452 is also in communication with a host data handling unit 470 via the bidirectional communication link 126 discussed above. While parallel bit multi line cables could provide the interface between the host 470 and the slave processor 452, a variety of data transmission techniques are available for this purpose including modems, fiber optic communications and equivalents, as will become apparent to those working in the art.

Figure 5:
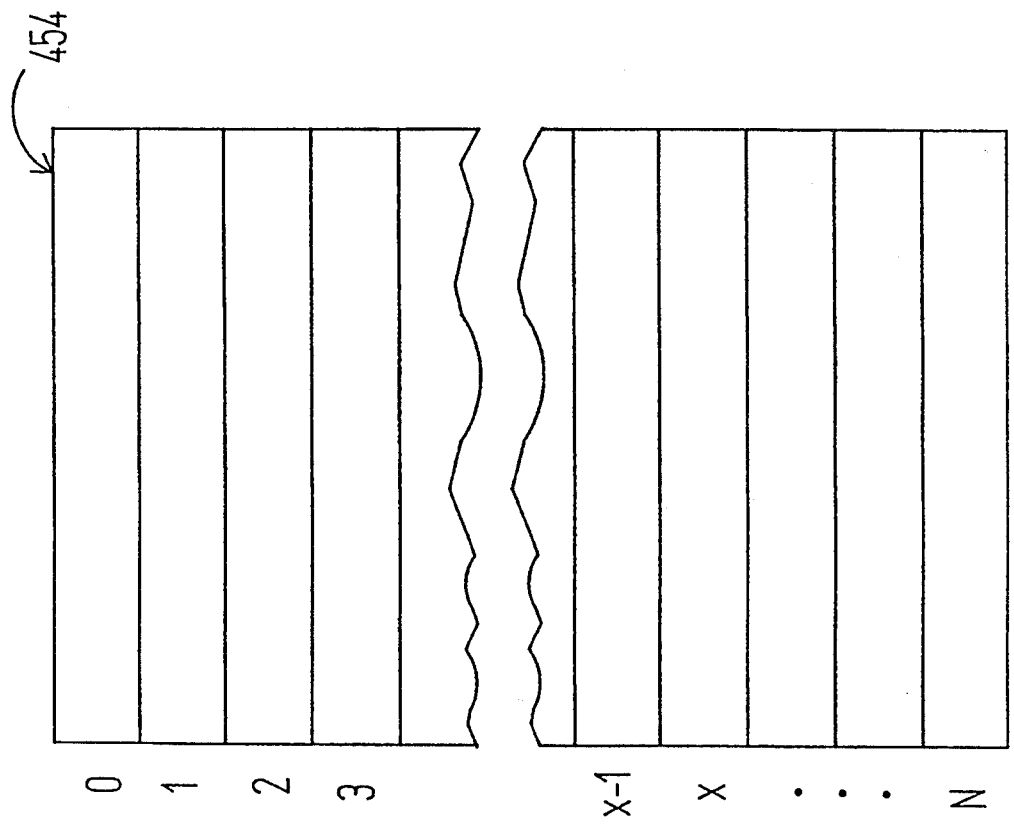
FIG. 5 is an illustration of a buffer memory organization in conjunction with the present invention.

The buffer memory 454 is represented in FIG. 5 as a table with a sequence of data storage locations 0 through N. As a byte, block or group of data is received from the sensor/converter array 116 over the cable 450, it is inserted in the next available location starting with location 0. As the host 470 notifies the slave processor 452 that it is ready to receive data, then the slave processor 452 begins transmitting blocks of data to the host 470 over the link 126 starting with the data contained in buffer memory 454 location 0. Loading of location N completes filling of the buffer memory 454 at which point the slave processor 452 immediately begins again loading data into location 0 as long as it is available. The slave processor 452 can concurrently handle entry of data blocks into the buffer memory 454 from the sensor array 116 and transmission of data blocks from the buffer memory 454 to the host 470.

As long as the host 470 requests data from the slave processor 452 as fast as, or faster than, data is inserted into the buffer memory 454, the system proceeds smoothly until data corresponding to the entire document 102 is scanned by the scanning mechanism. The transmission of data to the host 470 begins with the content of location 0 and proceeds sequentially to location "N" so that the buffer memory 454 is loaded and unloaded on a recycling first in, first out basis. Typically, the slave processor 452 is loading data in a downstream location of memory 454 such as at location "X" at the same time data is extracted from a prior memory location (e.g., 0, 1, 2, 3, etc.) for transfer to the host 470 interface.

The slave processor 452 notifies the master processor 440 whenever there is not enough empty memory locations to store a document line worth of data. By way of example, this might occur if the slave processor 452 has loaded location N but the host 470 has failed to request data contained in location 0. Alternatively, the host 470 may have received data from location 0 through location X, but the slave processor 452 has loaded through location N and wrapped around so that it has reloaded locations 0 through X-20 and it needs 30 locations for the next line. At this time, the master processor 440 notes the location of the array 116 relative to the document and stops the drive motor 112. It further reverses the drive motor 112 to return the carriage 106 to a point ahead of the noted stop location where it remains until the host 470 recovers data from the buffer memory's locations.

Figure 6:
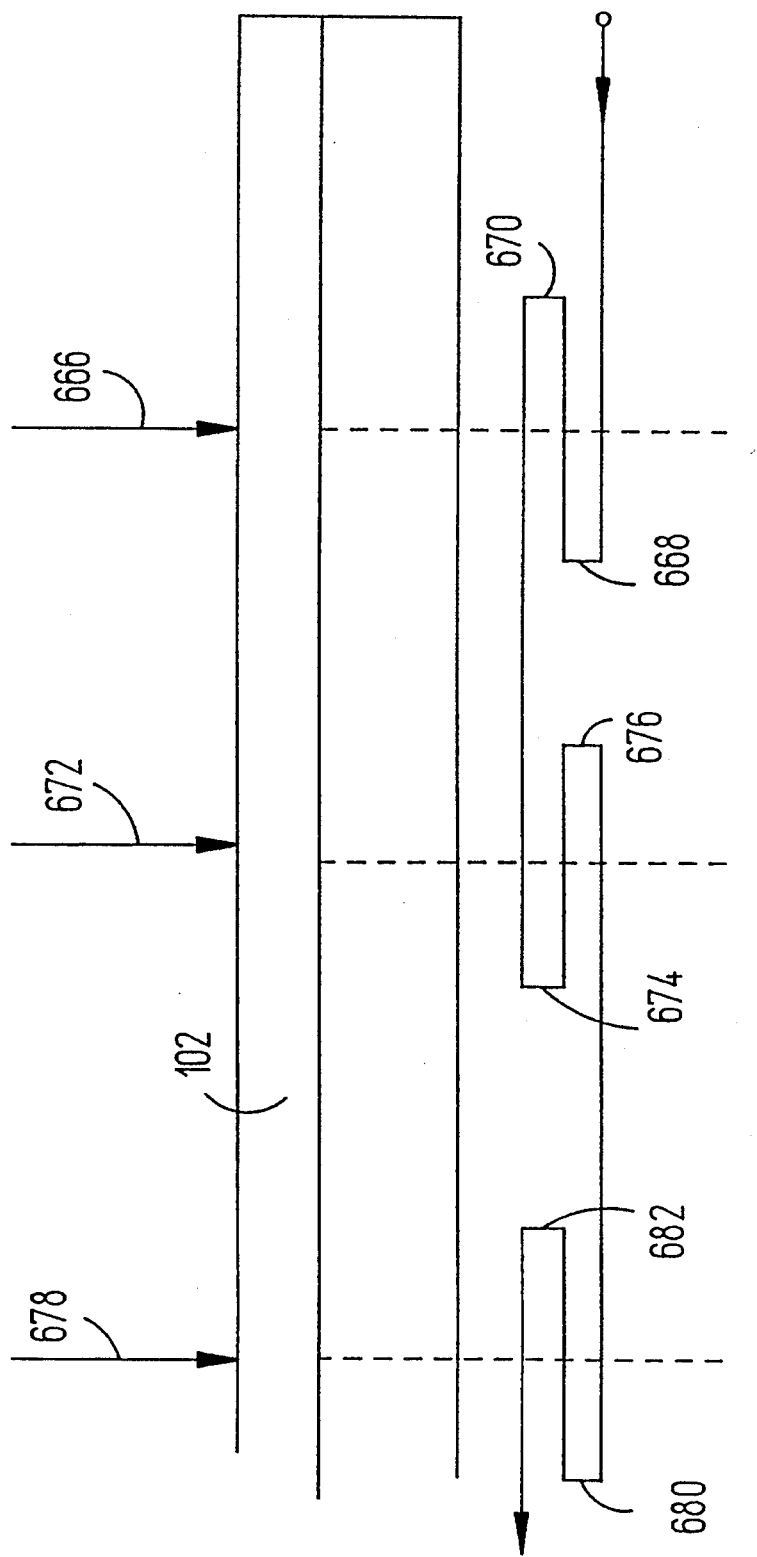
FIG. 6 is a representation of the scan head movement relative to a document as determined in conjunction with the present invention.

The movement of the carriage 106 relative to the platen 104 and the document 102 under consideration in accordance with the foregoing is depicted in FIG. 6. The master processor 440 actuates the drive motor 112 so that the carriage 106 is at a predetermined velocity as it reaches the leading edge of the document 102. For this example, assume that buffer memory 454 is full when the carriage 106 reaches line 666 of its scanning of the document 102. The master processor 440 causes the drive motor 112 to stop so that the carriage 106 halts as it reaches position 668 beyond 666. The master processor 440 reverses the drive motor 112 so that the carriage 106 returns to position 670 where it remains until the master processor 440 determines that the processor slave 452 can now load more data into the buffer memory 454. The distance from 670 to 666 is such that carriage 106 is again at full velocity as it reaches position 666 to start producing more scan data.

The foregoing stop/start sequence repeats each time the buffer memory 454 is full and awaiting a data request from the host 470. Two more such sequences are illustrated in FIG. 6 at 672-676 and 678-682. Eventually the complete document 102 defining the data to be scanned is loaded into the buffer memory 454 and transferred over the interface 126 to the remote host 470.

Figure 7:
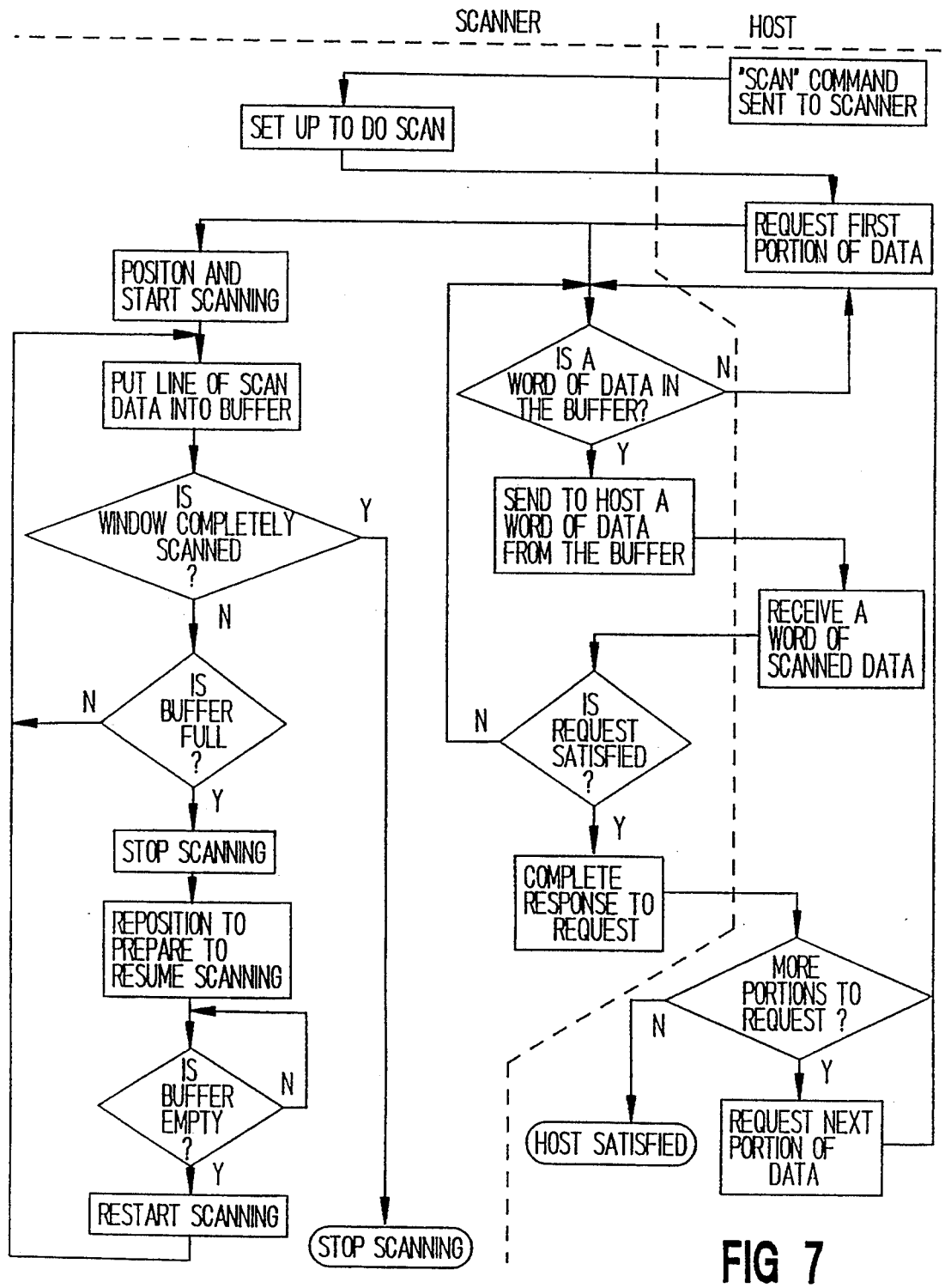
FIG. 7 is a flow chart of the system operation in accordance with the present invention.

FIG. 7 is a flow chart presenting the sequence of decisions and actions associated with the operation of the elements described herein in conjunction with the preferred embodiment. That is, FIG. 7 is a flow chart of a scan as it relates to buffer control. The right half of FIG. 7 is the host 470 which demands to receive data a portion at a time. The left side shows the scanner 100 which is doing two operations simultaneously: filling the buffer 454 with scanned data and emptying the buffer 454 as it fulfills the host requests. Otherwise FIG. 7 is straightforward and readily understood by those having normal skill in the art.

In a further embodiment of the present invention, the scanning system permits scanning of documents at various Y-positioning speeds. The scan line extents in conjunction with the present invention along the Y-direction are defined by the desired scanning resolution. The scan line extent is controlled by the relationship of the Y-positioning speed and the CCD exposure time. The goal is to synchronize the center of the exposure time with the time the carriage is over the center of the document line.

Figure 8:
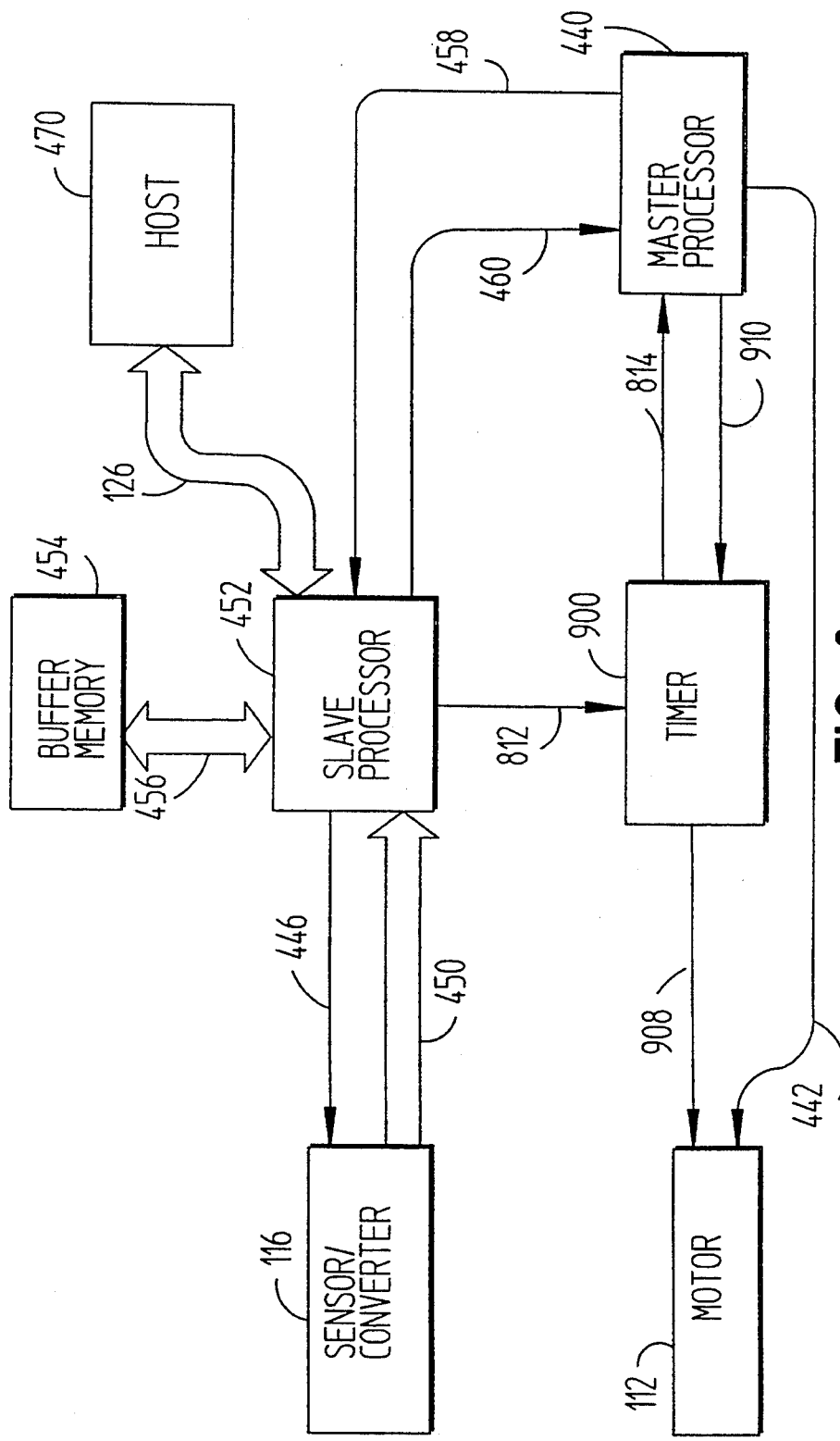
FIG. 8 is a block diagram of a scanner system in conjunction with the present invention.
Figure 9:
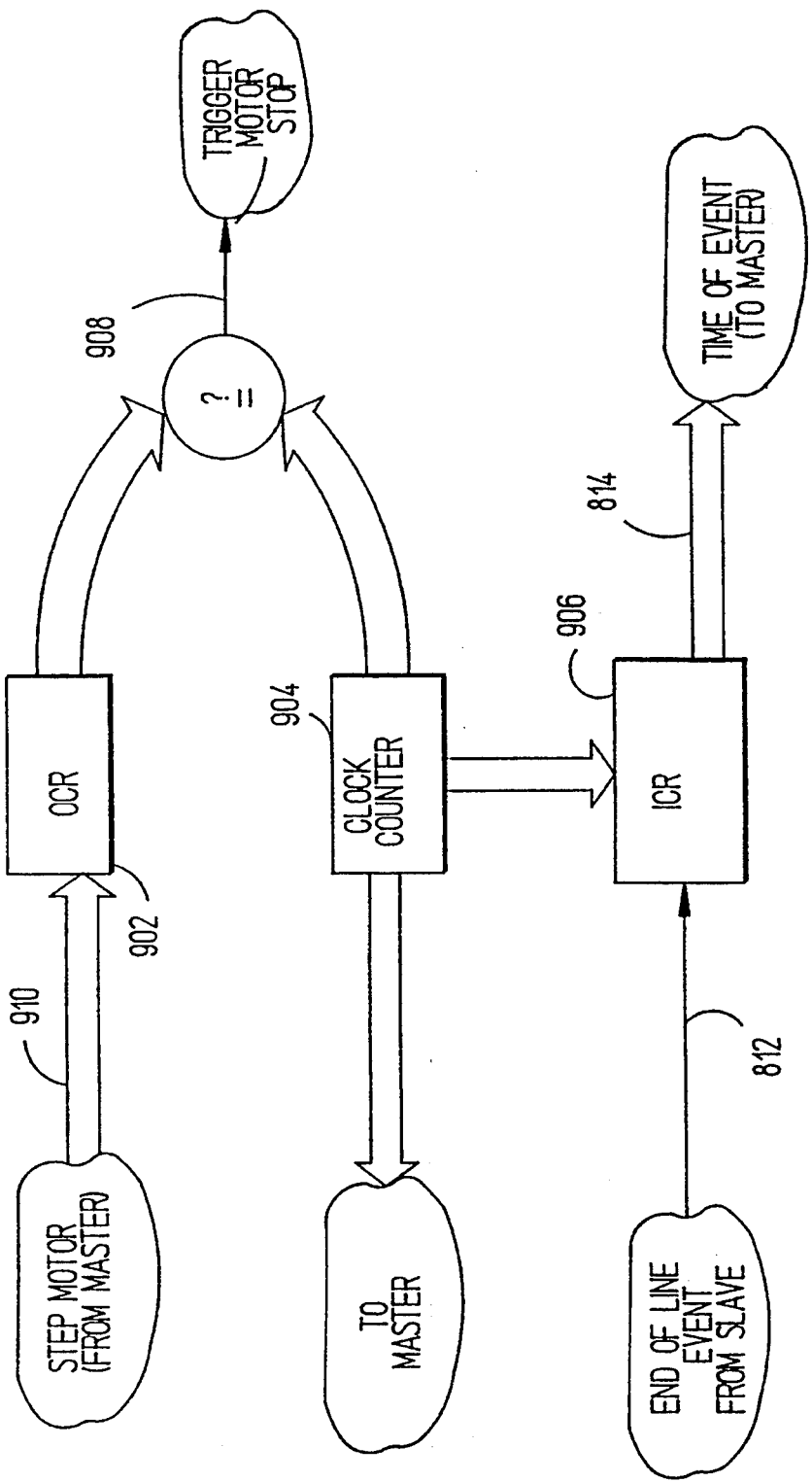
FIG. 9 is a block diagram of the timer shown in FIG. 8, in conjunction with the present invention.

Turning now to FIG. 8, a further embodiment of the present invention will be described. The master processor 440 enables the motor 112 using the control line 442. A timer 900 is common to the slave processor 452, the master processor 440 and the motor 112. A functional block diagram of the timer 900 is shown in FIG. 9.

The timer 900 includes an output compare register (OCR) 902, a free running clock counter 904 and an input compare register (ICR) 906.

Variable motor speeds are obtained by varying the value of the number input to the OCR 902 from the master processor 440 via a connection 910. When the number in the OCR 902 matches the number in the free running clock counter 904, a trigger pulse 908 is sent to the motor 112 to cause it to step.

Slower speeds are obtained by adding larger numbers to the previous contents of the OCR 902 and replacing those contents, while faster speeds are obtained by adding smaller numbers to the contents of the OCR 902 for successive steps.

Acceleration from a stopped condition to the desired scanning speed is done by stepping the motor 112 first slowly, and then increasingly faster until the desired scanning speed is reached, at which time the motor 112 is stepped consistently at the same rate.

The numbers which are added to the OCR 902 during acceleration time are taken from an "acceleration look-up table" which is a table of numbers from large to smaller in variable increments to smoothly allow the motor 112 to ramp up (accelerate) and to ramp down (decelerate). Acceleration is done by using the numbers from large to small and deceleration is done by backtracking from small to large. The look-up table is not shown in the figures, but would preferably be implemented using an EEPROM or a PLA, for example.

(Artisans will readily envision equivalent techniques to achieve the forgoing numerical comparison for stepping the motor at various speeds. It should be understood that this technique has been presented by way of example, and not limitation.)

In order for the master processor 440 to know where the carriage 106 is for every motor step it merely counts each step of the motor 112.

Figure 10:
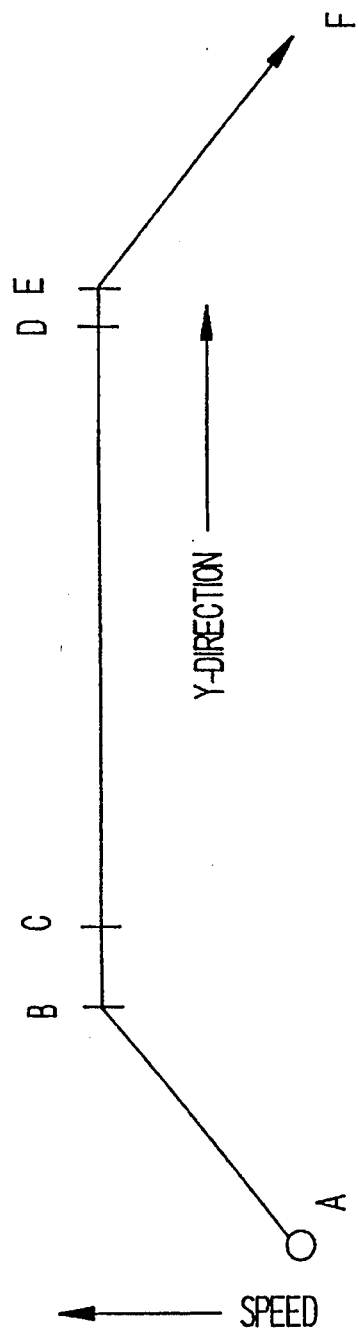
FIG. 10 is a diagram showing the relation of speed and distance in the Y-direction for a scan without repositions.

FIG. 10 is a diagram showing the relation of speed and distance in the Y-direction for a scan without repositions. The scanned data is represented by the section of line from point C to point D.

Note that it takes the same distance from point A to point B to accelerate the carriage 106 as it takes to decelerate the carriage 106 from point E to point F. Further, as shown in FIG. 10 between points B and E, TIME=DISTANCE·CONSTANT, because the carriage 106 is stepped at a constant rate.

The time between points B and C is the time (and distance) needed to stabilize the system and to synchronize the array with the motor speed in order to start the scan at precisely point C. Point C need not be on a motor step boundary, as will be discussed further below.

There is a short distance between point D, the end of the scanned data, and point E, the start of deceleration. This is not necessary, but in reality, it exists because it takes a finite time for the master processor 440 to realize the scan is done and to start the deceleration process.

Figure 11:
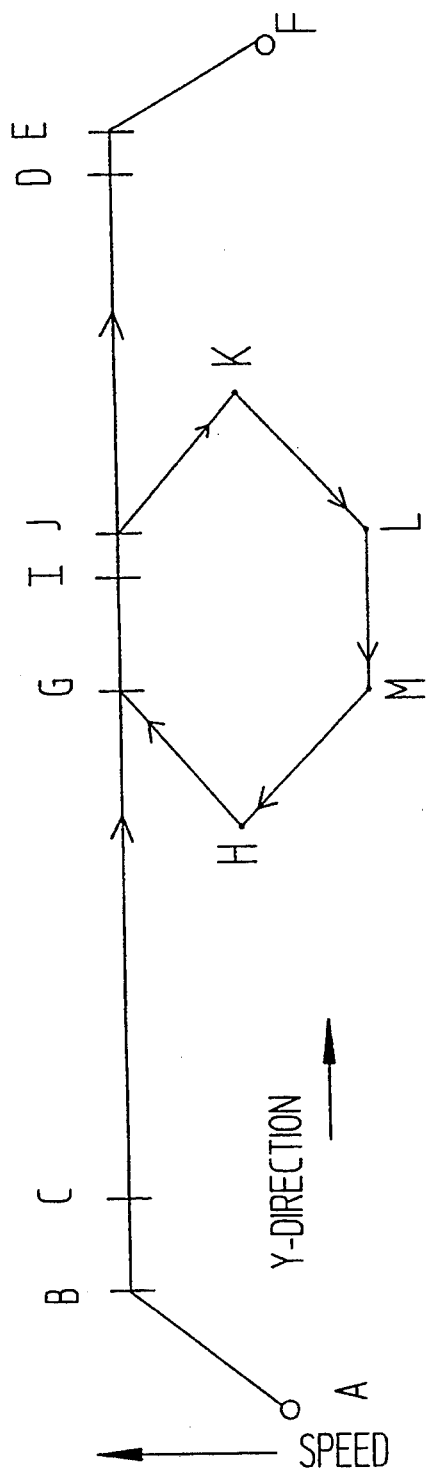
FIG. 11 is a diagram showing the relation of speed and distance in the Y-direction for a scan with one reposition in accordance with the present invention.

FIG. 11 is a diagram showing the relation of speed and distance in the Y-direction for a scan with one reposition. The scanned data is shown as the section of the line between points C and D. The reposition occurs at point I. It is important to note that points A, H, K and F are all at the same speed, namely 0.

As the carriage 106 (e.g., the array 116 and CCD cells 335) are stepped along and are scanning between points C and I, a scan line pause (or buffer full) condition is signalled by the slave processor 452 to the master processor 440 via connection 460.

Decelerating to a stop is shown by the line segment JK. The carriage 116 is then reversed by acceleration in the negative direction as shown by the line segment KL, until scanning speed is reached. The carriage moves backwards at scanning speed for the stabilization distance plus the reaction distance IJ, then the carriage decelerates again as shown by line segment MH and waits until it is time to start scanning again. The stabilization distance should be of sufficient length to permit the mechanical disturbances due to acceleration to reach steady state.

Again, it is important to note that points C, I and D do not have to occur on motor step boundaries.

As discussed above, the array 116 has one array of photosensing cells 335 and the two shift registers 336 and 338. At a signal from the slave processor (see connection 812 in FIG. 8), the information from the cells 335 is transferred to the shift registers 336 and 338. While the shift registers 336 and 338 are used 16 pass data to the slave processor 452 through connection 450, the CCD 335 is collecting information from the next line of the document.

Figure 12:
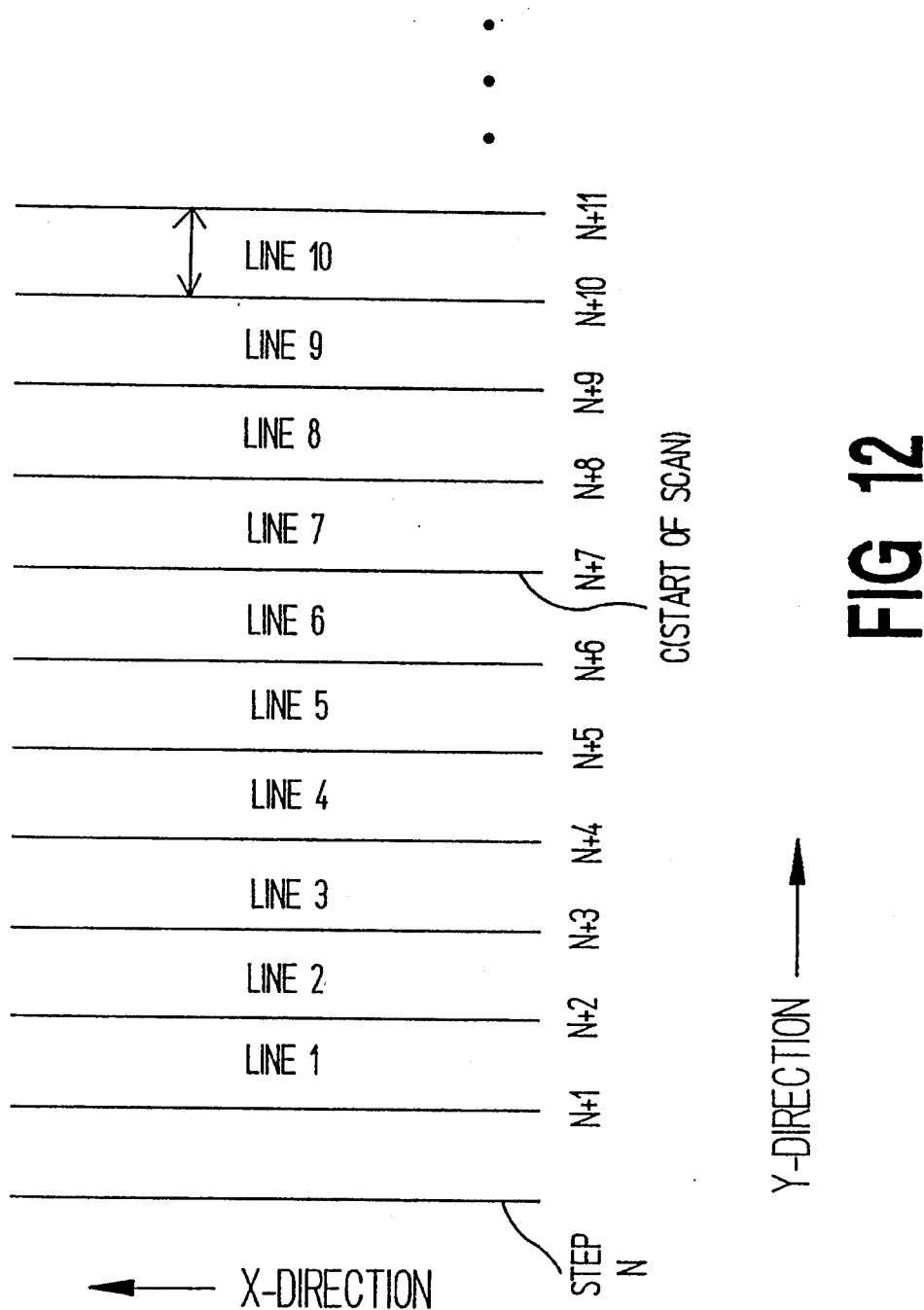
FIG. 12 shows the trivial case where motor steps and scan lines coincide.

FIG. 12 shows the trivial case where motor steps and scan lines coincide. This would occur, for instance, if the motor step caused the motor 112 to move 1/400th of an inch and the desired scan resolution in the Y-direction was 400 dpi.

Point Location C is where the scan should start, so "line 7" is the first line put into the buffer memory 454. Line 7 in FIG. 12 represents the area of information collected by the array, and coincides in this trivial case to the area on the document scanned by the array between motor step n+7 and motor step n+8.

The array collects line data prior to the start of the scan. Lines 1, 2 . . . 6 are collected normally by the array, but not put into the buffer memory by the slave processor. It is necessary, however, to have the array running during this time to allow various accumulated charges to dissipate and a new equilibrium to be reached.

Note that point C could be the start of a scan, or a re-start of a scan when a reposition takes place (i.e., like position I referred to in FIG. 11).

Figure 13:
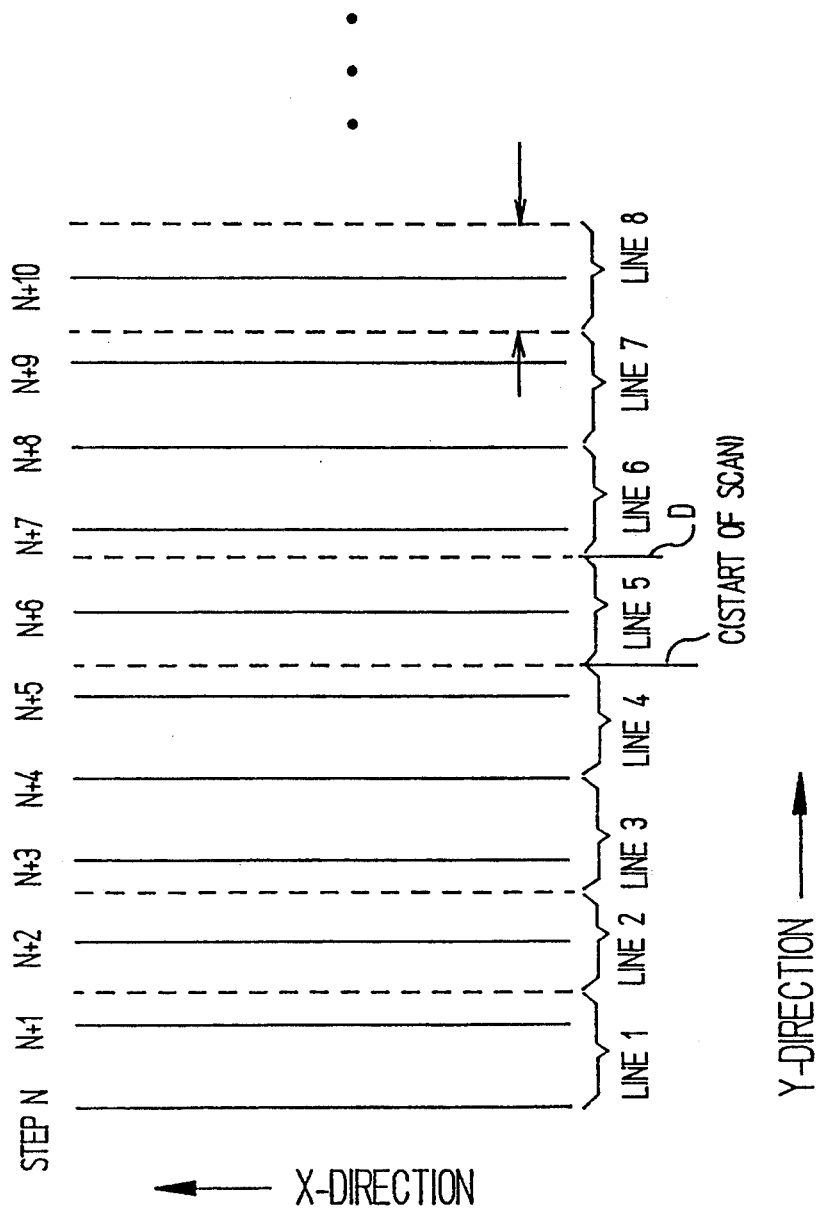
FIG. 13 shows the non-trivial case where motor steps and scan lines do not coincide in accordance with the present invention.

FIG. 13 shows the non-trivial case where motor steps and scan lines do not coincide. This would occur, for instance, if the motor step caused the motor to move 1/400th of an inch and the desired scan resolution in the Y-direction was 300 dpi. The scan line extents along the Y-direction are therefore defined by the relationship of the Y-positioning speed to the desired sensor array (CCD) exposure time. The scan lines define boundaries, wherein the boundaries occur on or between motor steps.

Point C is where the scan should start, so line 5 is the first line input to the buffer memory. Line 5 in FIG. 13 represents the area the sensor array collected information from, and in this case coincides with the area between point C (which is ⅓ of the way between step n+5 and step n+6) and point D (which is ⅔ of the way between step n+6 and step n+7).

It is important that the sensor array transfer the contents of photosensitive elements into the shift registers and start collecting information on the next line at point C.

The slave processor controls the sensor array in order to synchronize the scan lines coming from the sensor array over connection 446.

Every time the slave processor finishes processing a line from the sensor array, the slave processor interrupts the master processor through the timer. The interrupt is not necessarily handled immediately by the master processor, so a connection 812 is included between the slave processor and the timer's input capture register (ICR) 906 to signal an end of line event. The end of line event signaled on 812 allows the timer 900 to record the exact time of the end of line in the ICR 906.

The master processor counts scan lines by counting how many times the slave processor has signaled over the connection 460 and also knows precisely when an end of scan line interrupt occurred in relation to the last motor step, by reading the time of event information from the timer's ICR 906 via the connection 814.

If the end of line interrupt (460) is also the last line that could fit in the buffer memory 454 (as determined by the slave processor), the slave processor indicates to the master processor that the buffer is full via connection 460, for instance (i.e., connection 460 may be a multiconductor or trace connection as commonly used in the field). The master processor now knows, by reading the ICR, exactly when the buffer full took place in relation to the last motor step. This is the point where scanning must resume after a reposition.

Because the OCR 902 and the ICR 906 are both related to the same clock counter 904, and the motor is going at a constant speed, the position of the carriage 106 in relation to motor steps is known at precisely the time the buffer full condition is obtained.

The relationship between the motor step length and the desired resolution is used to determine the exact motor stepping or time between specific motor steps to resynch the sensor array.

After repositioning of the sensor array, that precise position/time is used to start the buffering of scanned data at exactly the spot it had previously stopped.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

We claim the following:

1. An image scanning system having a photosensing array, an image buffer and a stepper motor for producing digital data of an original having scan line extents along a Y-direction defined by a relationship of Y-positioning speed to a predetermined array exposure time, comprising:

first means for stepping the stepper motor at a Y-positioning speed for positioning the array with respect to the original;

second means for causing the array to transfer the data to the image buffer;

control means for synchronizing said first and second means and for varying said Y-positioning speed to thereby vary the extent of said scan line with respect to said motor steps and achieve one or more scanning resolutions;

third means for determining a buffer full condition and initiating a scan line pause by signaling said second means to stop transfer of the data; and fourth means for determining a position of the array in relation to said motor steps at a corresponding time of said scan line pause;

wherein said control means is further configured to reposition the array to resume scanning based on said determined position and said corresponding time.

2. A system according to claim 1, further comprising:

means for repositioning the array to a location traversed by the array prior to said scan line pause to thereby stabilize data scanned by the array prior to arriving at said position determined by said second means;

means for causing a center of the array exposure time to substantially coincide with a time when the array is positioned at the center of said scan line corresponding to said position of the array at the time of said scan line pause; and means for signalling said second means to again begin transfer of data form the array to the image buffer.

3. A method for scanning images in a system having a photosensing array, an image buffer and a stepper motor for producing digital data of an original having scan line extents along a Y-direction defined by the relationship of Y-positioning speed to a predetermined array exposure time, comprising the steps of:

stepping the motor at the Y-positioning speed for positioning the array with respect to the original;

causing the array to transfer the data to the image buffer;

synchronizing said stepping and said data transfer to vary said Y-positioning speed and thereby vary the extent of said scan line with respect to said motor steps and achieve one or more scanning resolutions;

determining a buffer full condition;

initiating a scan line pause to stop transfer of the data when said buffer full condition exists;

determining a position of the array in relation to said motor steps at a corresponding time of said scan line pause; and repositioning the array to resume scanning based on said determined position and said corresponding time.

4. A method according to claim 3, further comprising the steps of:

repositioning the array to a location traversed by the array prior to said scan line pause to thereby stabilize data scanned by the array prior to arriving at said position when data transfer stopped;

causing a center of the array exposure time to substantially coincide with a time when the array is positioned at the center of said scan line corresponding to said position of the array at said corresponding time of said scan line pause; and resuming transfer of data from the array to the image buffer.

5. An image scanning system having a photosensing array, an image buffer and a stepper motor having a predetermined step size, for producing digital data of an original having scan line extents along a Y-direction defined by a relationship of Y-positioning speed to a predetermined array exposure time, comprising:

first means for stepping the stepper motor at a Y-positioning speed for positioning the array with respect to the original;

second means for causing the array to transfer the data to the image buffer;

third means for determining a buffer full condition and initiating a scan line pause by signaling said second means to stop transfer of the data;

fourth means for determining a position of the array in relation to said motor steps at a corresponding time of said scan line pause;

fifth means for repositioning the array to resume scanning based on said determined position and said corresponding time to thereby synchronize restart of scanning with positioning information accurate to a small fraction of the stepper motor's step size and enable the system to resume scanning after said pause with a positional accuracy of much better than one scan line for a wide range of Y-positioning speeds.

* * * * *